US012726230B1

(12) United States Patent
Obeidat et al.

(10) Patent No.: US 12,726,230 B1
(45) Date of Patent: Sep. 1, 2026

(54) ELECTRO-QUASISTATIC ENABLED DEVICES

(71) Applicant: Amazon Technologies, Inc., Seattle, WA (US)

(72) Inventors: Khaled Ahmad Obeidat, San Jose, CA (US); Tahmid Rashid, Tracy, CA (US); Jagan Vaidyanathan Rajagopalan, San Jose, CA (US); Morris Yuanhsiang Hsu, Mountain View, CA (US); Chirag Bhavsar, Sunnyvale, CA (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 18/758,958

(22) Filed: Jun. 28, 2024

(51) Int. Cl.
*H04B 5/48* (2024.01)
*H04B 5/24* (2024.01)

(52) U.S. Cl.
CPC ................ *H04B 5/48* (2024.01); *H04B 5/24* (2024.01)

(58) Field of Classification Search
None
See application file for complete search history.

(56) References Cited

U.S. PATENT DOCUMENTS 6,583,911 B1 * 6/2003 Alexander ......... H04B 10/1121 398/187
8,928,276 B2 * 1/2015 Kesler ...................... H04B 5/79 320/108
9,086,746 B1 * 7/2015 Olsen ...................... H04B 5/77
9,178,572 B1 * 11/2015 Zhang ...................... H04B 5/77
(Continued)

FOREIGN PATENT DOCUMENTS

CN 1754330 A * 3/2006 ............. H04B 13/00
CN 1754331 A * 3/2006 ........... H04B 13/005
(Continued)

OTHER PUBLICATIONS

S. Sarkar et al. Effect_of_nearby_Metals_on_Electro-Quasistatic_Human_Body_Communication, IEEE 2025 (Year: 2025).*
(Continued)

*Primary Examiner* — Berhanu Tadese
(74) *Attorney, Agent, or Firm* — K&L Gates LLP

(57) ABSTRACT

Systems are generally described for enabling electro quasistatic (EQS) communication for devices. An example system includes a first electronic device comprising one or more first processors, a first converter circuitry coupled to at least one first processor, a first electrode, coupled to the first converter circuitry, positioned in proximity to a metal structure of a third device. The example system also includes, a second electronic device comprising a second electrode, coupled to the second converter circuitry, positioned in proximity to the metal structure of the third device and configured to receive EQS communication from the first device. The example system also includes a third device comprising the metal structure. The first device may be configured to encode a first datagram as a modulated signal waveform, and transmit by the first electrode, the modulated signal waveform via electro quasistatic transmission through the metal structure.

20 Claims, 4 Drawing Sheets

(56) References Cited

U.S. PATENT DOCUMENTS

| | | | | | |
|---|---|---|---|---|---|
| 9,692,526 | B2 * | 6/2017 | Linnartz | H04B 1/385 | |
| 9,729,644 | B1 * | 8/2017 | Cronin | H04W 4/60 | |
| 9,923,645 | B2 * | 3/2018 | Linnartz | H04B 13/005 | |
| 10,158,405 | B2 * | 12/2018 | Ruan | H04B 7/0413 | |
| 10,290,225 | B1 * | 5/2019 | Danyluk | H04B 5/73 | |
| 10,819,395 | B1 * | 10/2020 | Molitor | G06F 3/0484 | |
| 11,194,176 | B2 * | 12/2021 | Miller | G02B 27/0101 | |
| 11,457,279 | B1 * | 9/2022 | Coleman | H04N 21/632 | |
| 11,742,958 | B2 * | 8/2023 | Sen | H04B 13/005 | 455/41.1 |
| 11,784,844 | B2 * | 10/2023 | Gouleau | H04L 12/2816 | 709/223 |
| 11,792,741 | B2 * | 10/2023 | Manolakos | H04W 52/243 | 370/252 |
| 12,047,623 | B1 * | 7/2024 | Zhao | H04N 21/251 | |
| 12,057,896 | B2 * | 8/2024 | Cobler | G01V 3/10 | |
| 12,067,188 | B2 * | 8/2024 | Zerbe | G06F 3/044 | |
| 12,144,997 | B2 * | 11/2024 | Sen | A61N 1/37223 | |
| 12,231,189 | B2 * | 2/2025 | Cobler | H04B 5/73 | |
| 12,381,638 | B2 * | 8/2025 | Sen | H02J 50/12 | |
| 12,433,486 | B2 * | 10/2025 | Sen | A61B 5/7405 | |
| 2006/0146953 | A1 * | 7/2006 | Raghothaman | H04B 7/0413 | 375/267 |
| 2007/0201632 | A1 * | 8/2007 | Ionescu | H03M 13/1102 | 379/88.01 |
| 2015/0236546 | A1 * | 8/2015 | Kesler | H04B 5/26 | 455/573 |
| 2015/0255994 | A1 * | 9/2015 | Kesler | B60L 53/122 | 307/10.1 |
| 2016/0087687 | A1 * | 3/2016 | Kesler | H02J 50/80 | 307/104 |
| 2019/0364239 | A1 * | 11/2019 | Azad | H01Q 9/0435 | |
| 2019/0364324 | A1 * | 11/2019 | Rajagopalan | H01Q 1/38 | |
| 2021/0258080 | A1 * | 8/2021 | Sen | H04B 13/005 | |
| 2021/0399914 | A1 * | 12/2021 | Gouleau | H04L 12/282 | |
| 2022/0193427 | A1 * | 6/2022 | Sen | A61N 1/37223 | |
| 2022/0296165 | A1 * | 9/2022 | Datta | A61B 5/0006 | |
| 2023/0179308 | A1 * | 6/2023 | Sen | H02J 50/12 | 455/41.2 |
| 2023/0328494 | A1 * | 10/2023 | Sen | H04W 12/03 | 455/41.3 |
| 2023/0422237 | A1 * | 12/2023 | Qi | H04L 5/0051 | |
| 2025/0073479 | A1 * | 3/2025 | Sen | A61N 1/37223 | |
| 2025/0144291 | A1 * | 5/2025 | Dave | A61M 5/16804 | |
| 2025/0176830 | A1 * | 6/2025 | Sen | A61B 5/0031 | |
| 2025/0190053 | A1 * | 6/2025 | Yang | G02B 27/017 | |
| 2025/0192915 | A1 * | 6/2025 | Dey | H04B 13/005 | |
| 2025/0202599 | A1 * | 6/2025 | Moorefield, Jr | H04B 13/005 | |
| 2025/0211355 | A1 * | 6/2025 | Swan | H04J 3/247 | |
| 2025/0211470 | A1 * | 6/2025 | Roy | H04L 25/0384 | |
| 2025/0343606 | A1 * | 11/2025 | Sen | H04B 13/005 | |
| 2025/0358020 | A1 * | 11/2025 | Sen | H02J 50/12 | |
| 2025/0379663 | A1 * | 12/2025 | Sen | H04B 13/005 | |

FOREIGN PATENT DOCUMENTS

| | | | | | |
|---|---|---|---|---|---|
| CN | 101667870 | A | * | 3/2010 | A61L 15/60 |
| CN | 103634055 | A | * | 3/2014 | H04B 13/005 |
| CN | 101796867 | B | * | 11/2014 | H04W 72/23 |
| CN | 104243126 | A | * | 12/2014 | H04W 72/23 |
| CN | 104270230 | A | * | 1/2015 | H04W 72/23 |
| CN | 109477984 | A | * | 3/2019 | H04B 10/541 |
| CN | 117354897 | A | * | 1/2024 | H04W 72/1263 |
| CN | 119544092 | A | * | 2/2025 | H04B 13/005 |
| CN | 120415584 | A | * | 8/2025 | H04Q 11/0005 |
| DE | 102020002182 | A1 | * | 10/2021 | G08B 7/06 |
| EP | 1800270 | B1 | * | 9/2008 | H04B 13/005 |
| ES | 2753755 | T3 | * | 4/2020 | H04W 4/00 |
| ES | 2966035 | T3 | * | 4/2024 | G08B 25/007 |
| JP | 2004261243 | A | * | 9/2004 | G07C 9/257 |
| JP | 2004266388 | A | * | 9/2004 | H04B 13/00 |
| JP | WO2019239881 | A1 | * | 7/2021 | H04B 7/0617 |
| JP | 7365337 | B2 | * | 10/2023 | H04W 72/0453 |
| JP | 2025517980 | A | * | 6/2025 | H04L 5/0044 |
| KR | 20050104400 | A | * | 11/2005 | H04B 13/00 |
| KR | 20050104404 | A | * | 11/2005 | H04B 13/005 |
| KR | 101020313 | B1 | * | 3/2011 | H04B 13/00 |
| KR | 20250051371 | A | * | 4/2025 | A61N 1/3785 |
| TH | 2101005777 | A | * | 10/2024 | |
| TW | 1829291 | B | * | 1/2024 | H04L 5/0051 |
| TW | 202402092 | A | * | 1/2024 | H04L 5/0051 |
| WO | WO-0232019 | A1 | * | 4/2002 | H04B 10/1121 |
| WO | WO-2004077704 | A1 | * | 9/2004 | H04B 13/005 |
| WO | WO-2004077705 | A1 | * | 9/2004 | H04B 13/005 |
| WO | WO-2006040095 | A2 | * | 4/2006 | H04B 13/005 |
| WO | WO-2006070270 | A1 | * | 7/2006 | H04B 7/0854 |
| WO | WO-2019239881 | A1 | * | 12/2019 | H04L 27/26 |
| WO | WO-2021226492 | A1 | * | 11/2021 | H04W 4/023 |
| WO | WO-2022076094 | A1 | * | 4/2022 | H04W 72/541 |
| WO | WO-2022076107 | A1 | * | 4/2022 | G01S 13/003 |
| WO | WO-2023089576 | A1 | * | 5/2023 | A61B 5/7275 |
| WO | WO-2023163840 | A1 | * | 8/2023 | H04B 13/005 |
| WO | WO-2024129792 | A1 | * | 6/2024 | H10N 10/13 |
| WO | WO-2025079921 | A1 | * | 4/2025 | A61N 1/3785 |
| WO | WO-2025128447 | A1 | * | 6/2025 | G02C 11/10 |
| WO | WO-2025235338 | A1 | * | 11/2025 | H04B 13/005 |

OTHER PUBLICATIONS

Yang et al, In-the-Wild_Interference_Characterization_and_Modelling_for_Electro-Quasistatic-HBC_With_Miniaturized_Wearables, IEEE 2021 (Year: 2021).*

P. Krein et al, The_Electroquasistatics_of_the_capacitive_touch_panel, IEEE 1990 (Year: 1990).*

* cited by examiner

ELECTRO-QUASISTATIC ENABLED DEVICES

BACKGROUND

Electro-quasistatic (EQS) enabled devices are capable of transmitting and receiving signals using electric fields that are relatively static, e.g. at frequencies of 20 MHz or below or even 1 MHz or below. Devices may encode packets of data as variations in an electric field, which may be induced in a physical medium located between a transmitter and receiver device.

DETAILED DESCRIPTION

Figure 1:
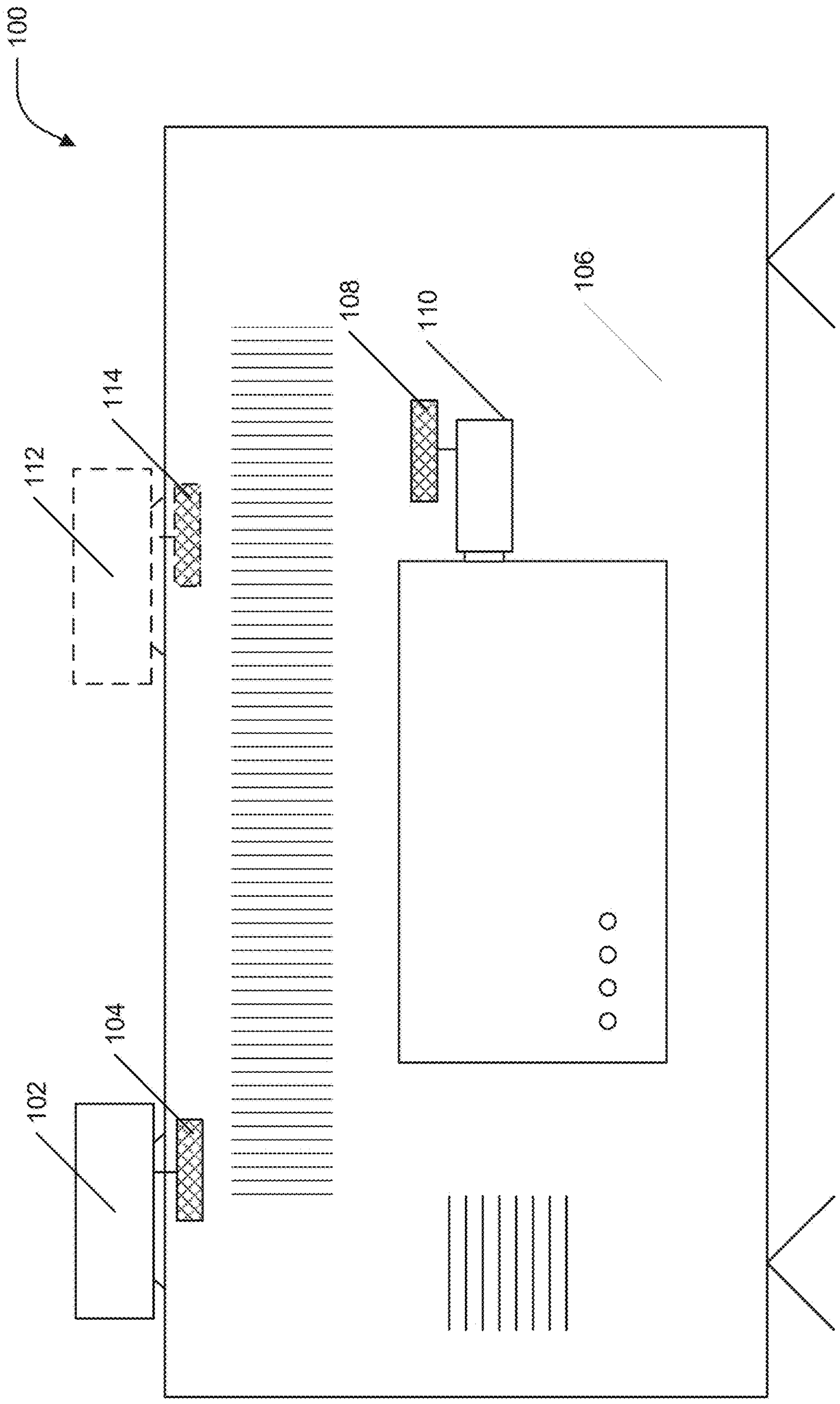
FIG. 1 illustrates an example system effective to provide EQS communication for electronic devices, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are systems, techniques, and interfaces for providing EQS communication for electronic devices. In various examples disclosed herein, example devices may provide digital information to converter circuitry, which may encode the digital information as a waveform. The converter circuitry may generate the waveform as an electrical signal by applying voltage to an electrode, which may be positioned adjacent to (e.g., in physical proximity to) a metal structure, such as the metal structure of a television or other similarly-sized electronic device. A second device may be similarly equipped with an electrode for receiving the transmitted electrical signals, collecting the transmitted waveform, and decoding the waveform to determine the transmitted digital information. In various examples, noise suppression may be achieved by differential coupling or other techniques to mitigate the effects of noise at megahertz frequency ranges.

In general terms, quasistatic electric fields, or (electro-quasistatic fields) are electric fields that may be described in terms of frequency values that are close enough to zero that zero-frequency (electrostatic) approximations are valid. These low-frequency approximations may be extended to describe the behavior of quasistatic electric fields. Quasistatic approximations are typically valid up to megahertz frequency ranges (below 100 MHz).

In various examples disclosed herein, devices may communicate with one another or other participating devices across a metal or other conducting structure using EQS fields. In EQS communication, a communication interface provides a voltage to an electrode that can be characterized as producing a time-varying EQS field at the electrode (or as impacting the electromagnetic field or photon field, depending on your preferred characterization). In accordance with one or more implementations, a quadrature phase shift keying modulation scheme is utilized for communicating data using a time-varying EQS field, e.g. by applying a voltage that varies with time based on QPSK modulation to produce an EQS field carrying the QPSK signal.

The electrode is electrically insulated from the conducting structure and any other conductors within the enclosure. For example, the electrode may be encapsulated within an insulator and separated from the metal structure by an insulated standoff. Electromagnetic field fluctuations caused by applying voltage to the transmitting electrode in turn cause electron movement in the conducting structure and electromagnetic field fluctuations that propagate through the conducting structure.

Electromagnetic field fluctuations caused by this process can be detected at a receive electrode disposed at or proximate another portion of the conducting structure. In accordance with one or more implementations, integrated circuit components are utilized to measure a voltage of a current generated at the receive electrode, and a signal is generated representing the time varying voltage, with signal data being generated using an analog to digital converter. In accordance with one or more implementations, QPSK demodulation is used to demodulate such a received signal.

Alternatively, in accordance with one or more implementations, a receiving device determines a signal based on measuring changes in capacitance at a receive electrode. In accordance with one or more implementations, an integrated circuit component is utilized and coupled to a receive electrode. Specifically, the receive electrode is coupled to a first terminal of an integrated circuit component using a first line. A capacitor is coupled to the first line, and coupled to a second terminal of the integrated circuit component. The integrated circuit component is configured to determine a change in capacitance of a system comprising the receive electrode caused by electromagnetic field fluctuations. It will be appreciated that various characterizations can be used for such a system. Electromagnetic field fluctuations cause a change in the amount of charge that can be stored/held by a capacitor system comprising the receive electrode at a given voltage level. It will be appreciated that movement of charged particles at the transmit electrode and in the conducting structure can be characterized as having an impact on the electromagnetic field or photon field (or as generating an electromagnetic field, depending on your preferred characterization), which in turn can impact the amount of charge that can be stored/held by the capacitor system comprising the receive electrode.

In accordance with one or more implementations, the integrated circuit component is configured to determine such a change in capacitance of the capacitor system comprising the receive electrode based on repeatedly charging and discharging a capacitor, and measuring an amount of time required to discharge the capacitor (e.g. an amount of time to discharge to a voltage below a configured threshold).

In accordance with one or more implementations, the integrated circuit component is configured to determine such a change in capacitance of the capacitor system comprising the receive electrode based on using an output from a charging and discharging capacitor as an input to a first counter that counts the number of rising or falling edges in a configured time period. If capacitance increases, the frequency of the output signal will decrease (because it takes longer to discharge the capacitor), and thus the edge count decreases.

In accordance with one or more implementations, signal data is determined based on changes in an amount of time to charge or discharge a capacitor. In accordance with one or more implementations, signal data is determined based on counting the number of rising or falling edges in a time period.

EQS communication offers advantages over other forms of electronic communication. EQS offers better physical security than communication based on electromagnetic radiation (e.g., wireless communication) and may also offer reduced power consumption and reduced sensitivity to interference from other radiation sources. Compared to wired communication, EQS offers the advantage of eliminating the need for wired interfaces and long cables that incur costs and inconveniences for users. Additionally, by using the EQS fields to transfer data between devices using EQS, regulatory issues associated with intentional or unintentional radiation of RF energy may be mitigated.

Despite its advantages, EQS communication must contend with several limitations as well. For example, EQS devices typically have shorter range than other communications technologies. Although EQS devices may avoid radiation-based interference, EQS devices must contend with noise sources in low frequency bands associated with the particular conductive medium used in each application. For some prior attempts to use EQS fields, the usable range for EQS fields to transfer data has been very short. For example, usable range for the fringing EQS fields may be on the order of centimeters, depending on the surrounding environment and voltage used to drive the electrode.

In various examples disclosed herein, an example system may be used to connect a device such as a streaming media player or smart television (or smart TV) stick to a peripheral device. In these examples, the smart TV stick may connect to another device, such as a television via an interface such as a high-definition multimedia interface (HDMI) interface for providing video and/or audio to the television. The smart TV stick may additionally function as a hub for peripheral devices, and a peripheral device may connect to the smart TV stick using EQS communication via the metal frame of the television. The peripheral device may be, for example, a camera or radar device that is physically attached to the television. The peripheral device may transmit and/or receive signals via EQS to communicate with the smart TV stick.

Turning to FIG. 1, an example system effective to provide EQS communication for electronic devices is shown. The system 100 includes a peripheral device 102 with attached electrode 104, which are both mounted on television 106. Signals transmitted through the television 106 may be received via electrode 108 by smart TV stick 110. It will be understood that the particular devices depicted in FIG. 1 are merely examples, and the example systems and methods disclosed herein may be embodied by different devices and configurations, for example, television 106 may be a different electronic device or other metal structure suitable for EQS communication. The peripheral device 102 and/or smart TV stick 110 may also be embodied by any electronic device known in the art, and various devices and components (including electrode 104 and electrode 108) may be sized, proportioned, and/or positioned in configurations other than those shown in FIG. 1.

As indicated in FIG. 1, system 100 may enable wireless EQS communication between peripheral device 102 and smart TV stick 110. For configurations such as the one shown in FIG. 1, use of a cable connecting peripheral device 102 and smart TV stick 110 may be undesirable due to the cost and inconvenience to the user. Likewise, traditional wireless communications (e.g., using WLAN, short-range wireless technology, or the like) may be undesirable due to the power requirements to transmit data at a rate (e.g., at least 20 Mbps) and latency required for certain applications (streaming video, for example). Using EQS communication may avoid the need for additional cabling while providing a low-power solution that also meets bandwidth and latency requirements.

The peripheral device 102 may be any electronic device known in the art, and peripheral device 102 may include various onboard circuitry for interfacing with the EQS communication system in addition to its primary function as a peripheral device. For example, peripheral device 102 may be a camera, microphone, speaker, radar, infrared sensor, game controller, wired interface (e.g., a universal serial bus hub) and/or the like. In some examples, the peripheral device 102 may be a low-power peripheral capable of being powered by battery, avoiding the need for power cabling and taking advantage of the low power requirements of the EQS communication system. The peripheral device 102 is wired or otherwise coupled to an electrode 104, which may be placed adjacent to (e.g., in physical proximity to) the television 106. In various examples, the electrode 104 may be external to peripheral device 102, or in other examples, the electrode 104 may be positioned to appear as part of the peripheral device 102 or positioned internally to peripheral device 102. The electrode 104 may be positioned on or near the surface or casing of the television 106 so that electric fields of the electrode may induce corresponding electromagnetic fields in the conducting metal frame of the television 106. Electrode 108 may similarly be placed on or near television 106, and electrode 108 may be constructed such that it is a separate external component of smart TV stick 110, attached to smart TV stick 110, or an internal component of smart TV stick 110.

The smart TV stick 110 is an example of a device that may be used in system 100 for EQS communication. In this example, smart TV stick 110 may connect to television 106 via a video interface to provide various video services and extend the capabilities of television 106. In various example, any computing device known in the art may be used in place of smart TV stick 110 to extend the capabilities of the computing device to communicate with peripheral device 102 via EQS communication. In the example in which smart TV stick 110 is as shown in FIG. 1, the smart TV stick 110 may use video data, presence data, or the like from peripheral device 102 to enhance the services provided via television 106. For example, peripheral device 102 may provide an indication that a user has entered the room, triggering a wakeup signal from smart TV stick 110 to change the display of television 106. Similarly, smart TV stick 110 may use video data from peripheral device 102 to make video calls or record video messages using television 106 in examples where peripheral device 102 includes a camera.

Although FIG. 1 is depicted with two devices communicating via the television 106, it will be understood that additional devices may be connected to the same conducting structure (e.g., television 106) to form a wider network of devices, depicted as optional peripheral device 112 with attached optional electrode 114. For example, additional participating devices such as peripheral device 112 may receive and/or transmit signals via EQS communications via respective electrodes. In various examples, additional electronic devices may form a mesh network, providing multiple access points for a client device. Participating devices may additionally or alternatively function as repeaters, boosting and repeating signals received by devices connected to the conducting structure to improve likelihood that additional participating devices receive clear signals. Accordingly, messages transmitted in a mesh network configuration may include network addresses for the intended recipient and other control information to facilitate delivery of communications to the intended destination. Devices receiving a message intended for a different device may repeat the received signal to route the message to its intended destination.

Figure 2:
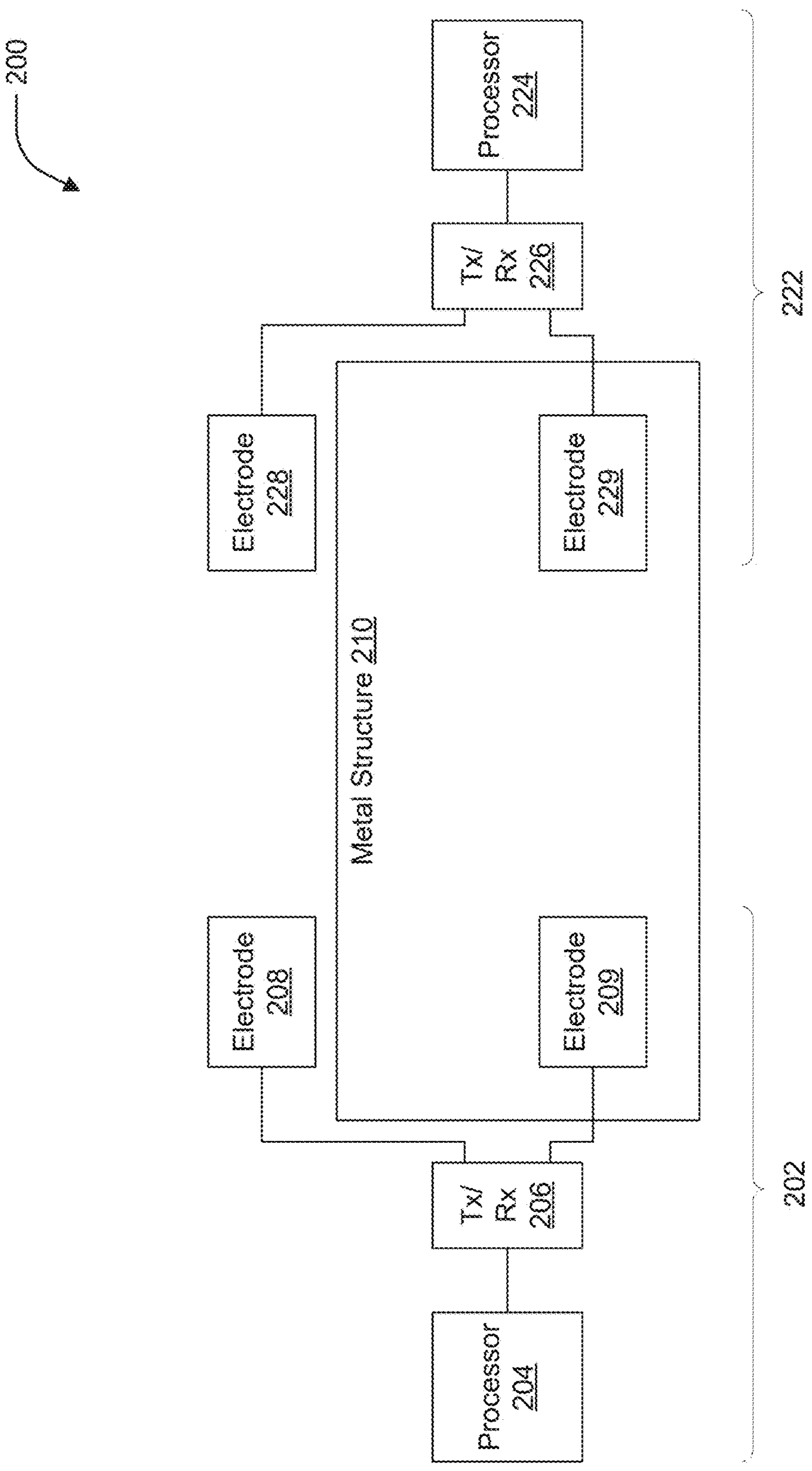
FIG. 2 illustrates a block diagram of another example system effective to provide EQS communication for electronic devices, in accordance with various aspects of the present disclosure.

Turning now to FIG. 2, a block diagram of another example system effective to provide EQS communication for electronic devices is shown. The system 200 includes a system 202 and a system 222, both of which may utilize EQS communication via a metal structure 210. The system 202 may include, for example, a processor 204, Tx/Rx 206, electrode 208, and electrode 209. Likewise, the system 222 may include, for example, a processor 224, Tx/Rx 226, electrode 228, and electrode 229. The processor 204 and processor 224 (described in further detail below in connection with FIG. 3) may be in communication with a converter circuitry and/or associated circuitry, represented by Tx/Rx 206 and Tx/Rx 226, respectively.

The Tx/Rx 206 and Tx/Rx 226 may be embodied by various circuitry capable of converting digital signals, such as a packet or other datagram from processor 204 or processor 224 into an analog waveform, such as a modulated signal waveform or other analog electrical signal. The Tx/Rx 206 and Tx/Rx 226 may accordingly include an analog to digital converter (ADC) and/or other circuitry for preparing the signal for EQS transmission. Likewise, the Tx/Rx 206 and Tx/Rx 226 may be configured to receive an analog signal via EQS communication and convert the analog signal to a digital signal (e.g., a packet or other datagram).

The term "datagram" as used herein may refer to any unit of data intended for transfer from one component or device to another. An example of a datagram is a packet, which may include a header with control information and a payload with data. The header or control information may include information required to route the packet to its intended destination and provide information about the sender. In various examples, a datagram may be prepared according to one or more standards for electronic communication for interoperability among systems. Datagrams may include information for error checking or correction such as checksums. A datagram may further include footer information, indicating the end of a packet and/or further control data.

In various examples, the Tx/Rx 206 and Tx/Rx 226 may be further configured to utilize one or more techniques to reduce the impact of electrical noise on signal transmission and receive signals with noise mitigation techniques applied. For example, Tx/Rx 206 and Tx/Rx 226 may use differential coupling via multiple electrodes, as shown by electrode 208 and electrode 209 (also electrode 228 and electrode 229). The Tx/Rx 206 and Tx/Rx 226 may produce a first modulated signal waveform and a second modulated signal waveform that is phase-shifted with respect to the first modulated signal waveform, for example, by a 180° phase shift. The Tx/Rx 206 and Tx/Rx 226 may similarly be configured to receive regular and phase-shifted EQS signals and analyze the differential signal to subtract noise, for example, using a coupler circuit or chip.

Tx/Rx 206 and Tx/Rx 226 may also be configured to reduce noise using frequency hopping. For example, Tx/Rx 206 and Tx/Rx 226 may determine a particular frequency channel has a noise rate exceeding a threshold. The noise rate may be measured by various metrics, such as a packet error rate (PER) or the like. In various example, Tx/Rx 206 and Tx/Rx 226 may also be configured to utilize active noise canceling. For example, Tx/Rx 206 and Tx/Rx 226 may measure a noise profile and add a noise canceling component to the signal waveform during transmission.

The Tx/Rx 206 or Tx/Rx 226 may be wired or otherwise coupled to electrode 208 and electrode 209 (or electrode 228 and electrode 229). The electrodes may function as capacitors in combination with the metal structure 210, such that a charge on an electrode induces a corresponding charge in the metal structure 210, giving rise to low-frequency (quasistatic) electromagnetic fields in the metal structure 210. Accordingly, a gap between an electrode (e.g., electrode 208, electrode 209, electrode 228, or electrode 229) and the metal structure 210 may be filled with a material (e.g., a dielectric material), for example, the plastic casing of a television or other electronic device such as polyvinyl chloride (PVC), polytetrafluoroethylene (PTFE), fiberglass, glass, a combination thereof, and/or the like. The metal structure 210 may be coupled to ground, for example, via the ground prong of an electrical power outlet. As shown in a configuration with two electrodes, one electrode may be positioned in an offset placement, as shown by the positioning of electrode 208 and electrode 228.

Figure 3:
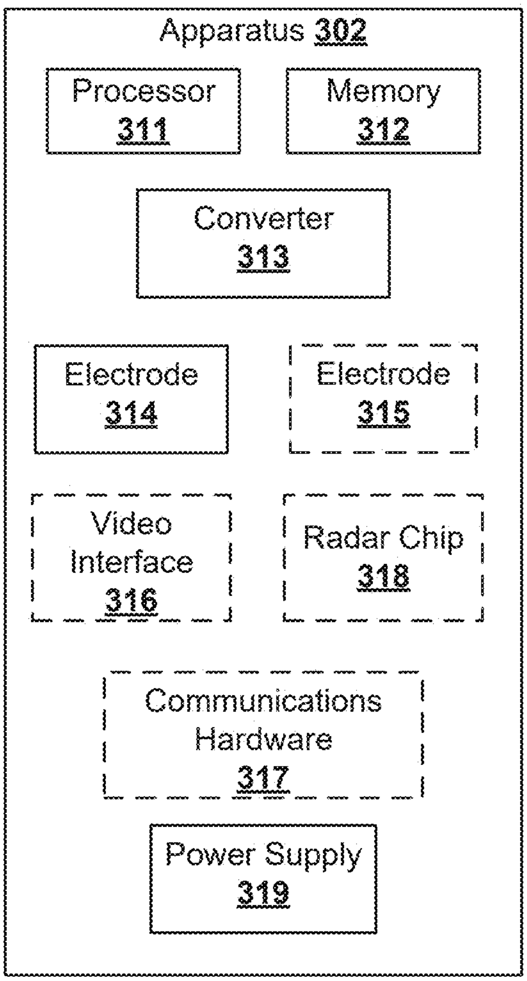
FIG. 3 illustrates an example apparatus effective to provide EQS communication for electronic devices, in accordance with various aspects of the present disclosure.

Turning to FIG. 3, the example apparatus 302 is shown for providing EQS communication for electronic devices. For example, apparatus 302 may perform operations described previously in connection with FIGS. 1-2. The apparatus 302 includes processor 311, memory 312, converter circuitry 313, and electrode 314, as depicted in FIG. 3. Apparatus 302 may further include a second electrode 315, video interface 316, and/or communication hardware 317. It will be understood that an apparatus depicted in FIG. 3 may include other circuitry and/or hardware not specifically described in connection with FIG. 3 (e.g., additional specialized circuitry, peripherals, and/or the like).

The processor 311 may be connected with the memory 312 and/or any other attached circuitry of the apparatus via a bus for passing information. In some examples processor 311 may include one or more hardware processors configured in tandem via a bus. The term "processor" as used herein may be understood to include a single core processor, a multi-core processor, multiple processors of the apparatus, remote or "cloud" processors, or any combination thereof.

Memory 312 are non-transitory and may include one or more volatile and/or non-volatile memories. For example, memory 312 may be random access memory, a hard disk, or any other electronic storage device (e.g., a computer readable storage medium). The memory 312 may be configured to store information, data, content, applications, software instructions, or the like, for enabling the apparatus to carry out various functions in accordance with various examples disclosed herein.

Converter circuitry 313 may be configured to produce analog electrical signals based on receiving digital signals or data, such as a packet or other datagram. In various example, converter circuitry 313 may perform functions described previously in connection with Tx/Rx 206 and Tx/Rx 226 of FIG. 3. For example, converter circuitry 313 may produce differential signals for noise reduction. The converter circuitry 313 may be wired or otherwise coupled to one or more electrodes, including electrode 314 and optionally electrode 315 (e.g., for differential coupling). Converter circuitry 313 may include circuitry functioning as a digital-to-analog converter and analog-to-digital converter for both transmitting and receiving EQS waveforms.

Converter circuitry 313 may be configured to perform various operations required to encode a digital datagram or packet as an analog electrical signal. For example, converter circuitry 313 may include modulation circuitry for modulating digital data onto a carrier signal. The converter circuitry 313 may use any carrier scheme known in the art, such as frequency shift keying, amplitude shift keying, or phase shift keying. The carrier scheme may be selected based on properties of the EQS communication medium (e.g., material, size, distance from electrode, and/or the like). Converter circuitry 313 may also be equipped with circuitry for carrier frequency generation and power amplification.

Converter circuitry 313 may be further configured to perform various operations required to convert an analog electrical signal to a digital packet or datagram. For example, the converter circuitry 313 may include circuitry for demodulation of the analog signal for recovering a baseband signal. The converter circuitry 313 may further include synchronization circuitry, decoding circuitry, and error correction circuitry for producing digital bit pattern data. The converter circuitry 313 may further include circuitry for extracting the payload from the first datagram or data packet.

The converter circuitry 313 may be implemented using an application-specific integrated circuit (ASIC), such as a dedicated chip or other integrated circuited. Converter circuitry may also be implemented as a field-programmable gate array (FPGA) or a combination of circuits including ASIC or FPGA.

Electrode 314 (and optionally, electrode 315) may be conducting elements sized and proportioned to transmit and receive EQS communication waveforms. Electrode 314 and electrode 315 may be configured based on the dimensions, materials, and other properties of a meal structure that may function as the medium for EQS communication. For example, the surface area, width, materials, standoff distance from the surface, and other such properties may be selected based on the intended metal surface (e.g., the metal structure of a television or other device). The electrode 314 and/or electrode 315 may be formed as part of a single structure with apparatus 302 or, in various examples, may be a separate attached entity connected by wire.

The electrode 314 (and/or electrode 315) may be positioned adjacent to (e.g., in physical proximity to) a metal surface. By being placed adjacent to the metal surface, the electrode 314 and/or electrode 315 may not be in physical contact with the metal surface, but rather may be placed at a range such that the electrode 314 and/or electrode 315 may be capacitively coupled to the metal surface. In other words, charges and corresponding electric fields on the surface of the electrode 314 and/or electrode 315 may influence charges and corresponding electric fields of the metal surface to allow the combination of the electrode 314 (and/or electrode 315) with the metal surface to act, in some regards, as a capacitor.

In various examples, the apparatus 302 may further include a video interface 316. For example, the apparatus 302 may be a smart TV stick (e.g., as depicted in FIG. 1) and may include an interface, such as a high-definition media interface or the like, for sending and receiving data with another electronic device.

The apparatus 302 may also include communication hardware 317, which may be devices or circuitries embodied in either hardware or a combination of hardware, firmware, and software that are configured to receive and/or transmit data from or to a network and/or any other device using wired and/or wireless communication. Communication hardware 317 may include a network interface and associated devices for communications with a network, such as antennas, buses, switches, routers, modems, supporting hardware, and/or supporting software. The communication hardware 317 may further include processing circuitry for causing transmission or handling receipt of signals to or from a network.

The apparatus 302 may also include a radar chip 318. For example, the apparatus 302 may be a peripheral device that may provide radar detection capabilities which may be transmitted do another device using EQS communication. The radar chip 318 may include various sub-components for providing radar capabilities, including transmitters, receives, digital signal converters, signal processing components, and/or other such components.

The apparatus 302 also includes a power supply 319. The power supply may include the ability to interface with one or more power sources, including AC and/or DC current sources and batteries, for example. In some examples, the apparatus 302 may be powered primarily or exclusively through a battery. The battery may be rechargeable or single use. The device may include a DC power backup option in addition to the battery. The demand for current from the battery may be relatively low due to the low power consumption of the EQS communication system, enabling smaller, lighter, and lower-cost batteries to be used with the apparatus 302.

Figure 4:
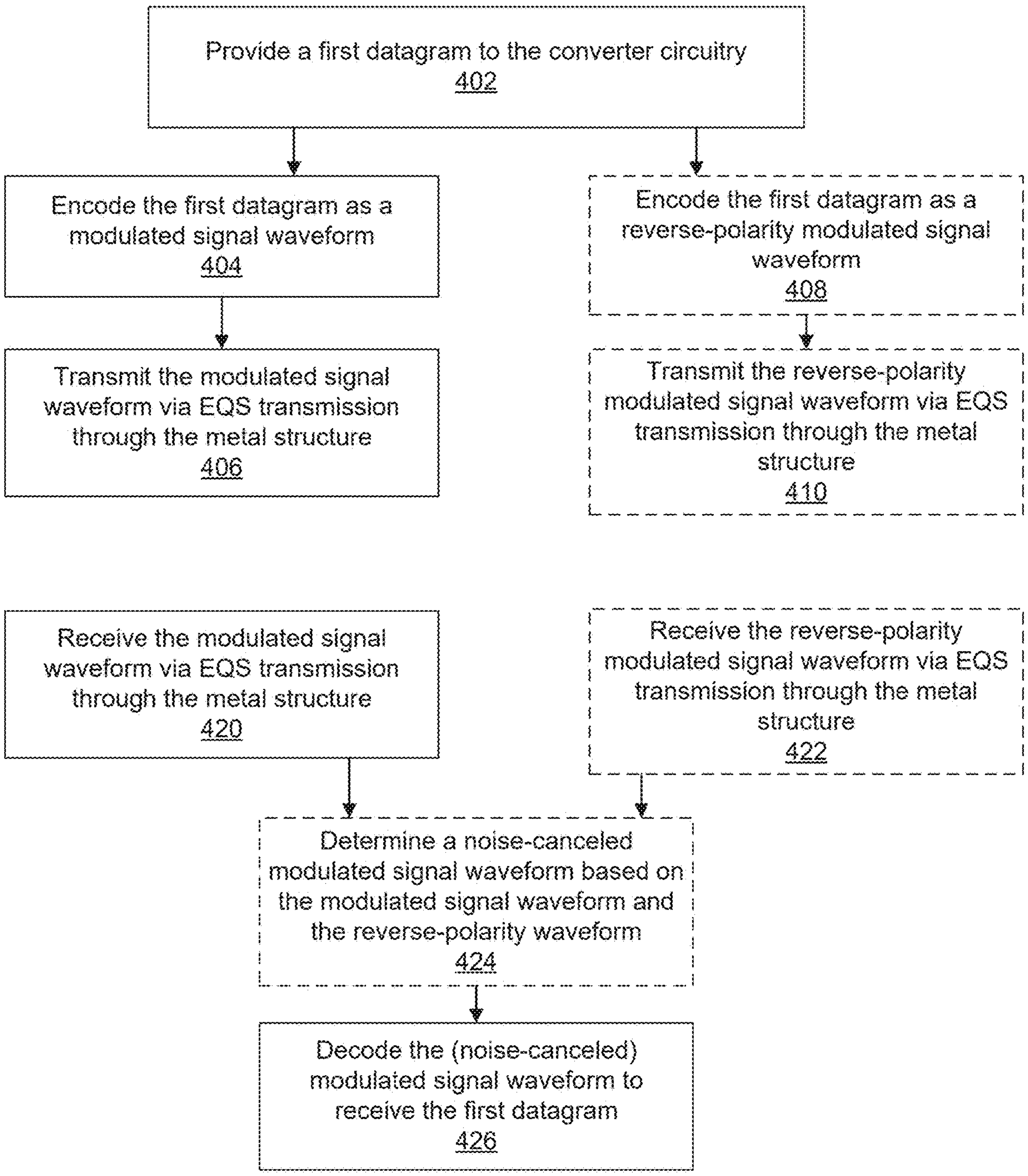
FIG. 4 is a block diagram illustrating an example process for providing EQS communication for electronic devices, in accordance with various aspects of the present disclosure.

FIG. 4 is a block diagram illustrating an example process for providing EQS communication for electronic devices, in accordance with various aspects of the present disclosure. Example flowcharts are illustrated that contain example operations implemented by various example devices described herein. The operations illustrated in FIG. 4 may, for example, be performed by an apparatus 302 embodying system 202 or system 222.

As shown by operation 402, apparatus 302 includes means, such as processor 311, memory 312, converter circuitry 313, and/or the like, for providing a first datagram to the converter circuitry (e.g., converter circuitry 313). The first datagram may be, for example, a data packet including information to be transferred to another device. The transfer of the datagram may be prepared and structured according to any network protocols or standards known in the art. For example, the datagram may include various checksum or error correction information to facilitate accurate transmission of the datagram to a second device. The processor 311 may prepare the first datagram based on payload data to be transferred to the second electronic device, for example, by adding header information or other data required for transmission. The processor 311 may then provide the first datagram to the converter circuitry 313 via a bus or other connection.

As shown by operation 404, apparatus 302 includes means, such as converter circuitry 313, and/or the like, for encoding the first datagram as a modulated signal waveform. The converter circuitry 313 may receive the first datagram, process the first datagram, and produce an analog waveform based on the first datagram. The modulated signal waveform may have a predefined range of frequencies that may be selected based on the materials used for EQS transmission, distance from the second electronic device, anticipated frequencies of noise, and/or other factors. The modulated signal waveform may be a low frequency signal, having a frequency of less than 30 MHz, or wavelengths in the general range of 15 meters.

Converter circuitry 313 may perform various operations for encode the digital datagram as the modulated signal waveform. For example, converter circuitry 313 modulate the digital data onto a carrier signal. The converter circuitry 313 may use any carrier scheme known in the art, such as frequency shift keying, amplitude shift keying, or phase shift keying. The carrier scheme may be selected based on properties of the EQS communication medium (e.g., material, size, distance from electrode, and/or the like).

As shown by operation 406, apparatus 302 includes means, such as converter circuitry 313, electrode 314, and/or the like, for transmitting, by the first electrode, the modulated signal waveform via electro quasistatic transmission through the metal structure. The converter circuitry 313 may produce an analog signal corresponding to the modulated signal waveform, and the analog signal voltage may be applied to the first electrode. The analog signal may be applied at a generally low voltage, generally in the range of less than one volt maximum. The analog signal may transmit via the first electrode through the metal structure to which the first electrode is placed in proximity. Converter circuitry 313 may perform, based on a carrier signal, carrier frequency generation and power amplification to produce the analog signal transmitted via the first electrode.

As shown by operation 408, apparatus 302 may include means, such as converter circuitry 313, and/or the like, for encoding the first datagram as a reverse-polarity modulated signal waveform. The converter circuitry 313 may receive the first datagram, process the first datagram, and produce a phase-shifted analog waveform based on the first datagram, where the phase-shifted analog waveform is phase-shifted with respect to the modulated signal wave form described in connection with operation 404. The reverse polarity or phase-shifted modulated signal waveform may also have the same signal frequency as the original waveform. The modulated signal waveform may be a low frequency signal, having a frequency of less than 30 MHz, or wavelengths in the general range of 15 meters.

In various examples, weights may be applied to the first modulated signal waveform and/or the reverse-polarity modulated signal waveform. For example, the converter circuitry 313 may perform a weighting procedure to apply weights to the first modulated signal waveform and/or the phase-shifted and/or reverse-polarity waveform based on properties of the waveforms, properties of the electrodes, properties of the transmission medium, and/or other conditions.

As shown by operation 410, apparatus 302 may include means, such as converter circuitry 313, electrode 315, and/or the like, for transmitting the reverse-polarity modulated signal waveform via EQS through the metal structure. The converter circuitry 313 may produce an analog signal corresponding to the phase-shifted and/or reverse-polarity modulated signal waveform, and the analog signal voltage may be applied to the second electrode (e.g., electrode 315). The analog signal may be applied at a generally low voltage, generally in the range of less than one volt maximum. The analog signal may transmit via the first electrode through the metal structure to which the first electrode is placed in proximity.

As shown by operation 420, apparatus 302 includes means, such as converter circuitry 313, electrode 314, and/or the like, for receiving the modulated signal waveform. The electrode 314 may receive an induced charge due to the EQS communication modulated signal waveform on the metal structure. The converter circuitry 313 may receive the electrical signal corresponding to the modulated signal waveform, which may subsequently be recorded, converted to digital signals, be used to perform other operations. In various examples, certain techniques may be used to reduce the effects of noise, such as thresholding, filtering, or other processing of incoming analog signals.

As shown by operation 422, apparatus 302 may include means, such as converter circuitry 313, electrode 315, and/or the like, for receiving, by the second reverse polarity electrode, the reverse-polarity modulated signal waveform. The second electrode (e.g., electrode 315) may receive an induced charge due to the EQS communication modulated signal waveform on the metal structure. Note that, in various examples, a separate electrode may not be needed to detect the reverse-polarity modulated signal waveform, and both waveforms may be collected using the same electrode and decoded together. The converter circuitry 313 may receive the electrical signal corresponding to the phase-shifted and/or reverse polarity modulated signal waveform, which may subsequently be recorded, converted to digital signals, be used to perform other operations. In various examples, certain techniques may be used to reduce the effects of noise, such as thresholding, filtering, or other processing of incoming analog signals.

As shown by operation 424, apparatus 302 may include means, such as converter circuitry 313, and/or the like, for determining a noise-canceled modulated signal waveform based on the modulated signal waveform and the reverse-polarity waveform. In various examples, the converter circuitry 313 may interpret the differential signals from the first modulated signal waveform and the phase-shifted and/or reverse-polarity waveform to produce a noise-canceled modulated signal waveform. For example, the converter circuitry 313 may perform phase re-alignment to ensure proper time-alignment of the received signals, in an instance in which one or more of the signals has received a phase shift or time lag in addition to the phase shift applied to the differential signal. The re-alignment may be based on known properties of the EQS communication medium or may be determined and adjusted empirically through manual or automatic processes to achieve an ideal signal efficiency. The converter circuitry 313 may subsequently subtract the original and phase-shifted or reverse-polarity signal to produce a combined signal. In various examples, an additional filtering step may be applied to the combined signal, such as thresholding, amplification, filtering, level shifting, or other manipulation to produce the final noise-canceled modulated signal waveform. For example, the converter circuitry 313 may perform a weighting procedure to apply weights to the first modulated signal waveform and/or the phase-shifted and/or reverse-polarity waveform.

As shown by operation 426, apparatus 302 includes means, such as converter circuitry 313, and/or the like, for decoding the modulated signal waveform to receive the first datagram. In various examples, the converter circuitry 313 may decode the noise-canceled modulated signal waveform or the modulated signal waveform received via the first electrode. The converter circuitry 313 may perform various operations to decide the modulated signal waveform and produce the first datagram. For example, the converter circuitry 313 may perform demodulation to recover a baseband signal from the waveform. The converter circuitry 313 may further perform synchronization to extract a digital bit pattern from the baseband signal. The baseband signal may be further decoded and error corrected to determine the first datagram.

In various examples, the apparatus 302 may determine a packet error rate. The packet error rate may be determined by sending and receiving packets or datagrams for diagnostic purposes or determining metrics from packets or datagrams sent or received for other purposes. Errors may be tabulated and used to compute a packet error rate over a predetermined period of time. The apparatus 302 may, in various examples determine that the packet error rate exceeds a threshold. The threshold may be predetermined or selected during configuration of the apparatus 302.

The apparatus 302, in an instance in which the packet error rate exceeds a threshold, may select a second signal frequency. The second signal frequency may be a channel of a larger frequency band available for transmitting and receiving EQS communication. In various examples, the apparatus 302 may generate a random sequence of frequency channels to be sued for a frequency hopping for noise reduction. The sequence of random channels may be transmitted to the second electronic device to synchronize the use of frequency channels.

Subsequently, the converter circuitry 313 may encode the first datagram as a second modulated signal waveform, where the second modulated signal waveform uses the second signal frequency, which may be one of the frequency channels from the sequence of random channels. The converter circuitry 313 may subsequently switch to the next frequency channel from the random list of frequency channels and transmit subsequent waveforms using the selected channel. In various examples, rather than a random list of frequency channels, the converter circuitry 313 may adaptively select a frequency channel based on error rates or detected conditions of each frequency channel.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A system comprising:

a streaming media player device comprising:

one or more first processors, a first converter circuitry wired to at least one first processor, and a first electrode, wired to the first converter circuitry, positioned in proximity to a metal structure of a television device;

an accessory device comprising:

one or more second processors, a second converter circuitry wired to at least one second processor, and a second electrode, wired to the second converter circuitry, positioned in proximity to the metal structure of a third device; and the third device comprising the metal structure, wherein the streaming media player device further comprises one or more first computer readable media storing first processor executable instructions which, when executed using the one or more first processors, cause the streaming media player device to perform operations comprising:

providing a first datagram to the first converter circuitry;

encoding the first datagram as a modulated signal waveform; and transmitting, by the first electrode, the modulated signal waveform via electro quasistatic transmission through the metal structure;

wherein the accessory device further comprises one or more second computer readable media storing second processor executable instructions which, when executed using the one or more second processors, cause the accessory device to perform operations comprising:

receiving, by the second electrode, the modulated signal waveform;

determining a noise waveform associated with the metal structure; and decoding, using the noise waveform, the modulated signal waveform to receive the first datagram.

2. The system of claim 1, wherein the streaming media player device further comprises a first reverse polarity electrode, wherein the one or more first computer readable media store processor executable instructions which, when executed using the one or more first processors, cause the streaming media player device to perform operations comprising:

encoding the first datagram as a reverse-polarity modulated signal waveform; and transmitting, by the first reverse polarity electrode, the reverse-polarity modulated signal waveform.

3. The system of claim 2, wherein the accessory device further comprises a second reverse polarity electrode, wherein the one or more second computer readable media store processor executable instructions which, when executed using the one or more second processors, cause the accessory device to perform operations comprising:

receiving, by the second reverse polarity electrode, the reverse-polarity modulated signal waveform; and determining a noise-canceled modulated signal waveform based on the modulated signal waveform and the reverse-polarity modulated signal waveform, wherein receiving the first datagram is further based on the noise-canceled modulated signal waveform.

4. The system of claim 1, wherein the streaming media player device further comprises a first reverse polarity electrode, wherein the one or more first computer readable media store processor executable instructions which, when executed using the one or more first processors, cause the streaming media player device to perform operations comprising:

determining a packet error rate;

determining that the packet error rate has exceeded a threshold;

selecting a second signal frequency;

encoding the first datagram as a second modulated signal waveform, wherein the second modulated signal waveform uses the second signal frequency, and transmitting, by the first electrode, the second modulated signal waveform via electro quasistatic transmission through the metal structure.

5. A streaming media player device comprising:

a wireless radio;

a wired interface;

one or more processors;

a converter circuitry coupled to the one or more processors;

a first electrode, coupled to the converter circuitry and positioned adjacent to a metal structure; and one or more computer readable media storing first processor executable instructions which, when executed using the one or more processors, cause the streaming media player device to perform operations comprising:

receiving, using the wireless radio, first data representing streaming content, sending, via the wired interface, video data representing the streaming content to a television, providing a first datagram to the converter circuitry, determining a noise waveform associated with the metal structure, encoding, using the noise waveform, the first datagram as a first modulated signal waveform, and transmitting, by the first electrode, the first modulated signal waveform via electro quasistatic transmission through the metal structure.

6. The streaming media player device of claim 5, further comprising a second electrode, wherein the one or more computer readable media store second processor executable instructions which, when executed using the one or more processors, cause the streaming media player device to perform operations comprising:

encoding the first datagram as a second modulated signal waveform, wherein the second modulated signal waveform is phase-shifted relative to the first modulated signal waveform; and transmitting, by the second electrode, the second modulated signal waveform via electro quasistatic transmission through the metal structure.

7. The streaming media player device of claim 6, wherein the one or more computer readable media store second processor executable instructions which, when executed using the one or more processors, cause the streaming media player device to perform operations comprising:

receiving, by the first electrode, a third modulated signal waveform;

receiving, by the second electrode, a fourth modulated signal waveform, determining a fifth modulated signal waveform based on the third modulated signal waveform and the fourth modulated signal waveform; and decoding the fifth modulated signal waveform to determine a second datagram.

8. The streaming media player device of claim 7, wherein the one or more computer readable media store second processor executable instructions which, when executed using the one or more processors, cause the streaming media player device to perform operations comprising:

determining a weighting value based on the third modulated signal waveform and the fourth modulated signal waveform; and modifying the third modulated signal waveform to produce a weighted third modulated signal waveform, wherein the determining the fifth modulated signal waveform is further based on the weighted third modulated signal waveform.

9. The streaming media player device of claim 5, wherein the first modulated signal waveform uses a first signal frequency, wherein the one or more computer readable media store second processor executable instructions which, when executed using the one or more processors, cause the streaming media player device to perform operations comprising:

determining a noise rate;

determining that the noise rate has exceeded a threshold;

selecting a second signal frequency;

encoding the first datagram as a second modulated signal waveform, wherein the second modulated signal waveform uses the second signal frequency, and transmitting, by the first electrode, the second modulated signal waveform via electro quasistatic transmission through the metal structure.

10. The streaming media player device of claim 9, wherein the one or more computer readable media store second processor executable instructions which, when executed using the one or more processors, cause the streaming media player device to perform operations comprising:

determining a packet error rate, wherein the noise rate is based at least in part on the packet error rate.

11. The streaming media player device of claim 5, wherein the one or more computer readable media store second processor executable instructions which, when executed using the one or more processors, cause the streaming media player device to perform operations comprising:

generating a noise canceling waveform, based at least in part on the noise waveform, wherein the encoding the first datagram as the first modulated signal waveform is further based on the noise canceling waveform.

12. The streaming media player device of claim 5, wherein the first modulated signal waveform has a characteristic signal frequency less than 30 MHz.

13. The streaming media player device of claim 5, further comprising:

an interface port coupled to the one or more processors, wherein the one or more computer readable media store second processor executable instructions which, when executed using the one or more processors, cause the streaming media player device to perform operations comprising:

transmitting, via the interface port, digital video data.

14. The streaming media player device of claim 5, wherein a second streaming media player device comprises the metal structure, wherein the metal structure is coupled to electrical ground.

15. The streaming media player device of claim 5, further comprising a battery, wherein the streaming media player device is powered by the battery.

16. A method comprising:

determining, using one or more processors of a streaming media player device physically connected to a television, first message data representing a message to be communicated to an accessory device;

determining a noise waveform associated with a metal structure, generating, based on the first message data and using a first modulation scheme and the noise waveform, first signal data;

supplying time-varying electric current to an electrode of the streaming media player device that causes time-varying electric field fluctuations representative of the signal data with a frequency of less than 100 megahertz to propagate through the television and to an electrode of an accessory device physically connected to the television.

17. The method of claim 16, wherein the method further comprises generating, using one or more processors of the accessory device and based on electric field fluctuations at the electrode of the accessory device, second signal data; and determining, based on the second signal data and using a first demodulation scheme, the first message data.

18. The method of claim 16, wherein the first modulation scheme is a quadrature phase shift keying modulation scheme.

19. The method of claim 16, wherein the method comprises varying a voltage for the providing of electric current or varying an amount of current provided.

20. A streaming media player device comprising:

one or more processors;

one or more computer readable media storing processor executable instructions which, when executed using the one or more processors, cause the streaming media player device to perform operations comprising determining, using one or more processors of a streaming media player device physically connected to a television, first message data representing a message to be communicated to an accessory device, determining a noise waveform associated with a metal structure, generating, based on the first message data and using a first modulation scheme and the noise waveform, first signal data, providing electric current to an electrode of the streaming media player device that causes generation of a time-varying electro-quasistatic (EQS) field representative of the message data.

* * * * *